US011913669B2

(12) United States Patent
Lv

(10) Patent No.: US 11,913,669 B2
(45) Date of Patent: Feb. 27, 2024

(54) AIR CONDITIONING INDOOR UNIT, AND AIR CONDITIONER

(71) Applicants: GD MIDEA AIR-CONDITIONING EQUIPMENT CO., LTD., Guangdong (CN); MIDEA GROUP CO., LTD., Guangdong (CN)

(72) Inventor: Jianhua Lv, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 381 days.

(21) Appl. No.: 17/462,514

(22) Filed: Aug. 31, 2021

(65) Prior Publication Data

US 2021/0389019 A1    Dec. 16, 2021

Related U.S. Application Data

(63) Continuation of application No. PCT/CN2019/113408, filed on Oct. 25, 2019.

(30) Foreign Application Priority Data

Mar. 3, 2019   (CN) .......................... 201920267897.2

(51) Int. Cl.
*F24F 13/20*      (2006.01)
*F24F 1/0035*     (2019.01)
(Continued)

(52) U.S. Cl.
CPC ............ *F24F 13/20* (2013.01); *F24F 1/0035* (2019.02); *F24F 13/06* (2013.01); *F16J 15/44* (2013.01);
(Continued)

(58) Field of Classification Search
CPC .... F24F 13/20; F24F 13/0035; F24F 13/0014; F24F 13/0047; F24F 13/005;
(Continued)

(56) References Cited

U.S. PATENT DOCUMENTS 3,289,746 A    12/1966   Kline

FOREIGN PATENT DOCUMENTS

CN         1632386 A      6/2005
CN       205119278 U      3/2016
(Continued)

OTHER PUBLICATIONS

International Search Report and Written Opinion of the International Searching Authority dated Jan. 20, 2020 received in International Application No. PCT/CN2019/113408 together with an English language translation.
(Continued)

*Primary Examiner* — Emmanuel E Duke
(74) *Attorney, Agent, or Firm* — Scully, Scott, Murphy & Presser, P.C.

(57) ABSTRACT

Disclosed are an air conditioning indoor unit and an air conditioner. The air conditioning indoor unit includes a housing and a ventilator in the housing. The housing has a frame and a panel. The panel defines a first ventilation opening, and the frame defines a second ventilation opening corresponding to the first ventilation opening. The ventilator is communicated with the second ventilation opening. The air conditioning indoor unit further includes a sealer disposed at the second ventilation opening and configured to seal a gap between the frame and the ventilator and/or to seal a gap between the frame and the panel.

20 Claims, 10 Drawing Sheets

(51) Int. Cl.
*F24F 13/06* (2006.01)
*F24F 1/0057* (2019.01)
*F24F 1/005* (2019.01)
*F24F 1/0047* (2019.01)
*F16J 15/44* (2006.01)
*F24F 1/0014* (2019.01)
*F24F 1/32* (2011.01)

(52) U.S. Cl.
CPC ............. *F24F 1/005* (2019.02); *F24F 1/0014* (2013.01); *F24F 1/0047* (2019.02); *F24F 1/0057* (2019.02); *F24F 1/32* (2013.01)

(58) Field of Classification Search
CPC ........ F24F 13/0057; F24F 13/32; F24F 13/06; F16J 15/44
See application file for complete search history.

(56) References Cited

FOREIGN PATENT DOCUMENTS

| | | |
|---|---|---|
| CN | 106352514 A | 1/2017 |
| CN | 106642355 A | 5/2017 |
| CN | 107339745 A | 11/2017 |
| CN | 107477695 A | 12/2017 |
| CN | 207196695 U | 4/2018 |
| CN | 108224563 A | 6/2018 |
| CN | 108489057 A | 9/2018 |
| CN | 108571807 A | 9/2018 |
| CN | 108644895 A | 10/2018 |
| CN | 207945734 U | 10/2018 |
| CN | 108731107 A | 11/2018 |
| CN | 208418968 U | 1/2019 |
| EP | 3106766 A1 | 12/2016 |
| JP | S50-79235 U | 7/1975 |
| JP | S63-141483 U | 9/1988 |
| JP | H0262319 U | 5/1990 |
| JP | H0515718 A | 1/1993 |
| JP | H05-8184 U | 2/1993 |
| JP | H08-135997 A | 5/1996 |
| JP | H08-327104 A | 12/1996 |
| JP | 2001-021169 A | 1/2001 |
| JP | 2002-071171 A | 3/2002 |
| JP | 2002-089923 A | 3/2002 |
| JP | 2003-021358 A | 1/2003 |
| JP | 2004-138315 A | 5/2004 |
| JP | 2004-257635 A | 9/2004 |
| JP | 2008-082994 A | 4/2008 |
| KR | 100802595 B1 * | 2/2008 ............... E06B 7/04 |
| KR | 20180010894 A * | 1/2018 ............... A61L 9/20 |

OTHER PUBLICATIONS

Extended European Search Report dated Sep. 22, 2020 received in European Patent Application No. EP 19798517.9.
Notice of Reasons for Refusal dated Jun. 29, 2021 received in Japanese Patent Application No. JP 2019-563186 together with an English language translation.
Notice of Reasons for Refusal dated Jan. 18, 2022 received in Japanese Patent Application No. JP 2019-563186 together with an English language translation.
Decision to Grant a Patent dated Jun. 21, 2022 received in Japanese Patent Application No. JP 2019-563186.
Office Action dated Nov. 3, 2022 received in European Patent Application No. EP 19798517.9.

* cited by examiner

AIR CONDITIONING INDOOR UNIT, AND AIR CONDITIONER

CROSS-REFERENCE TO RELATED APPLICATIONS

The present disclosure is a continuation application of PCT International Application No. PCT/CN2019/113408, filed on Oct. 25, 2019, which claims the priority of Chinese patent application No. 201920267897.2, entitled "Air conditioning indoor unit, and air conditioner", filed Mar. 3, 2019, the entire content of which are hereby incorporated by reference for all purposes. No new matter has been introduced.

FIELD

The present disclosure relates to the technical field of air conditioners, in particular to an air conditioning indoor unit and an air conditioner using the air conditioning indoor unit.

BACKGROUND

With increasing demands of users on quality of life, air conditioners, which are widely used in daily life, have also been optimized accordingly. Ventilation system have been introduced into indoor units of air conditioners, which brings outside air into rooms and provides continuous and fresh air for closed indoor space. Thus, the oxygen content of indoor air can be increased and air conditioner sickness can be eliminated.

However, a gap exists between the assembly of the ventilator and the panel component. For example, the gap exists between the ventilator and the frame or between the panel and the frame, which brings about air leakage from the air outlet of the ventilator. As such, the air output of the ventilator has been reduced to some extent, and the air exchange capacity of the ventilator is lowered. Further, such leakage may induce noise and condensation when the air enters the air conditioning indoor unit.

SUMMARY

The present disclosure proposes an air conditioner indoor unit of an air conditioner, aiming at solving air leakage of a ventilator at the air outlet.

In order to achieve the above object, among others, the air conditioning indoor unit proposed by the present disclosure includes:
 a housing including a frame and a panel, where the panel defines a first ventilation opening, and the frame defines a second ventilation opening corresponding to the first ventilation opening;
 a ventilator in the housing, communicated with the second ventilation opening; and
 a sealer disposed at the second ventilation opening, configured to seal a gap between the frame and the ventilator and/or seal a gap between the frame and the panel.

In one embodiment, the first ventilation opening includes one opening or a plurality of small holes.

In one embodiment, the sealer includes a first sealing ring fit sandwiched between the frame and the ventilator.

In one embodiment, the sealer includes a second sealing ring fit sandwiched between the frame and the panel.

In one embodiment, the sealer includes a first sealing ring, a second sealing ring and a third sealing ring connecting one end of the first sealing ring to one end of the second sealing ring;

the first sealing ring, the second sealing ring and the third sealing ring are enclosed to form an opening groove, and a part of the frame corresponding to the edge of the second ventilation opening is embedded in the opening groove;

the first sealing ring is abutted against the ventilator, and the second sealing ring is abutted against the panel.

In one embodiment, the first sealing ring, the second sealing ring and the third sealing ring are integrally formed.

In one embodiment, the first sealing ring includes a first installing protrusion at a side of close to the ventilator, the ventilator defines a first groove corresponding to the first installing protrusion, for accommodating the first installing protrusion.

In one embodiment, the first installing protrusion is obliquely disposed.

In one embodiment, the first sealing ring includes a second installing protrusion at a side of close to the panel, the panel defines a second groove corresponding to the second installing protrusion, for accommodating the second installing protrusion.

In one embodiment, the second installing protrusion is obliquely disposed.

In one embodiment, the second sealing ring defines a limiting groove at a side close to the frame, and the frame includes a limiting protrusion correspondingly mated with the limiting groove.

In one embodiment, a cross section of the limiting protrusion and the limiting groove has a rectangular, a dovetail or a "V" shape.

In one embodiment, the first sealing ring includes a guiding portion at an end away from the third sealing ring, in which the guiding portion is obliquely disposed towards the ventilator in a direction away from the third sealing ring.

In one embodiment, the ventilator includes a ventilation cover, at least one inner wall surface of the ventilation cover is inclined in a direction from the frame to the panel, and a distance between the inner wall surface and a wall surface opposite to the inner wall surface is increased in a direction from the frame to the panel;
 the third sealing ring is inclined and provided correspondingly to a side of the inner wall surface, and the side is inclined in a direction consistent to the direction of the inner wall surface.

In one embodiment, the ventilation cover includes a ventilation screen.

In one embodiment, the ventilator includes a ventilation cover, a ventilation passage and a fan in the ventilation cover, in which the ventilation passage is independent from an air passage of the air conditioning indoor unit, and includes an air inlet and an air outlet, in which the air inlet is communicated with the outer environment; the air outlet is communicated with the second ventilation opening.

In one embodiment, the panel includes a panel body and an air ventilation plate connected with the panel body, the air ventilation plate is disposed correspondingly to the ventilator, and defines the first ventilation opening.

In at least one embodiment, the air ventilation plate is detachably connected with the panel body; or, the air ventilation plate is rotatably mounted on the panel body.

In one embodiment, the air conditioning indoor unit is a stand unit, a ceiling unit or a wall-mounted indoor unit.

The present disclosure further proposes an air conditioner, which includes an air conditioning outdoor unit and an air conditioning indoor unit connected with the air conditioning outdoor unit, where the air conditioning indoor unit includes:

a housing including a frame and a panel, in which the panel defines a first ventilation opening, and the frame defines a second ventilation opening corresponding to the first ventilation opening;

a ventilator in the housing, communicated with the second ventilation opening; and a sealer disposed at the second ventilation opening, configured to seal a gap between the frame and the ventilator and/or seal a gap between the frame and the panel.

According to the air conditioning indoor unit proposed by the present disclosure, the sealer is disposed at the second ventilation opening of the frame, and the sealer can seal the gap between the frame and the ventilator and/or the gap between the frame and the panel, so that the air outlet of the ventilator does not leak into the housing, thereby reducing the loss of the air output of the ventilator, improving the air exchange capacity of the ventilator, and simultaneously preventing the air from entering the interior of the air conditioning indoor unit body to bring about noise and condensation.

BRIEF DESCRIPTION OF THE DRAWINGS

In order to explain the embodiment of the present disclosure or the technical solution of the prior art clearer, the following will briefly introduce the drawings necessary in the description of the embodiments or the prior art. Obviously, the drawings in the following description are only some embodiments of the present disclosure. For those ordinary skill in the art, other drawings can be obtained according to the structure shown in these drawings without any creative effort.

DESCRIPTION OF REFERENCE NUMERALS

Figure 1:
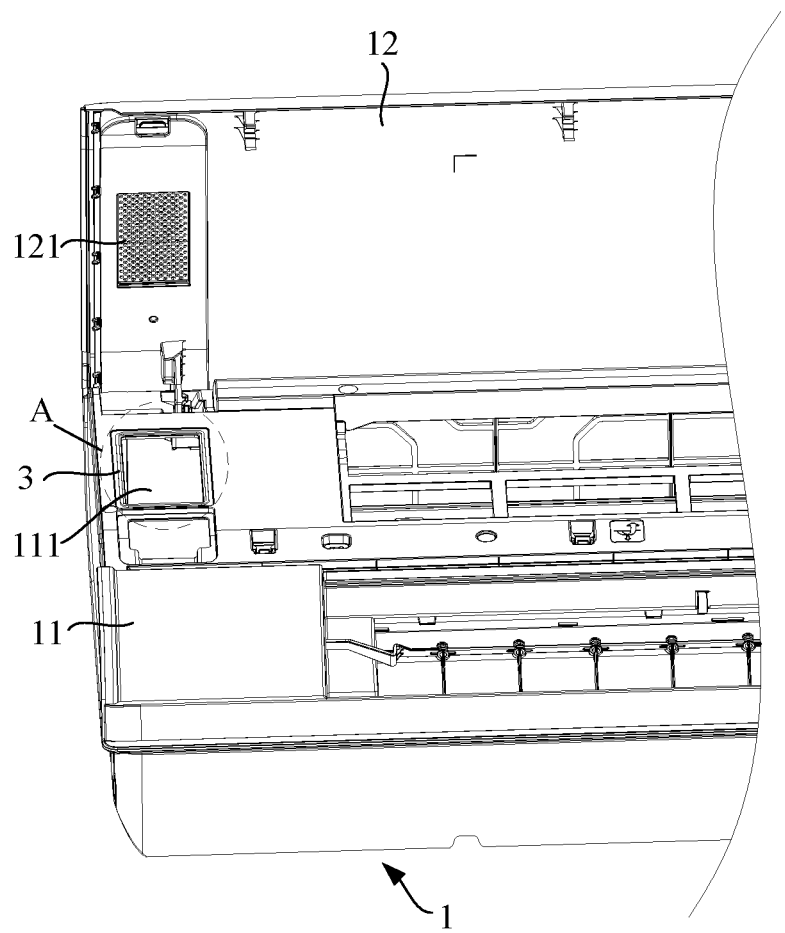
FIG. 1 is a schematic cross sectional view of an air conditioning indoor unit according to an embodiment of the present disclosure.
Figure 2:
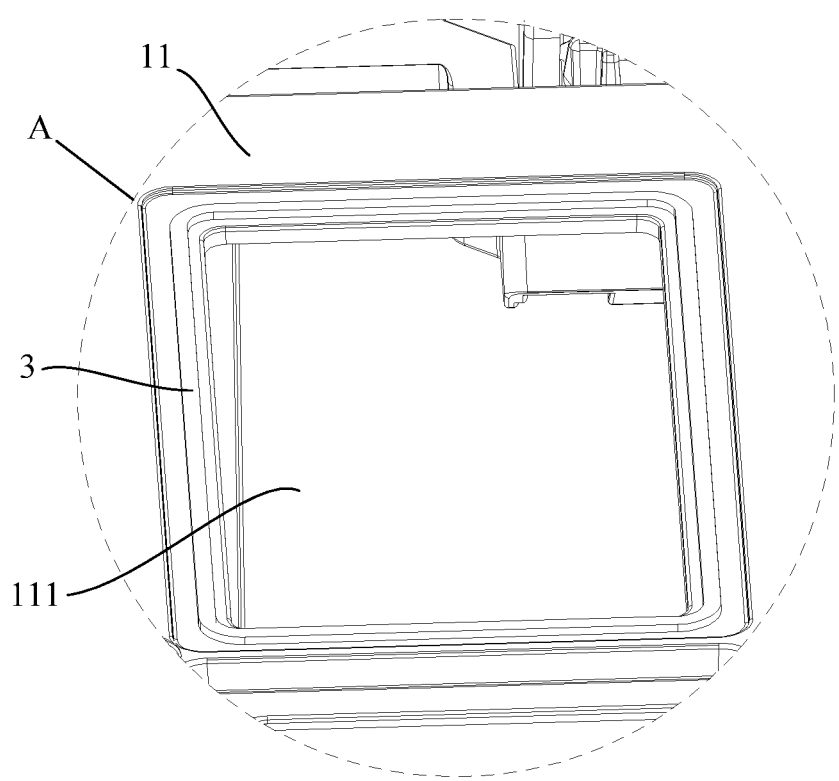
FIG. 2 is a partial enlarged view at portion A in FIG. 1.

| Reference Numeral | Name |
| --- | --- |
| 100 | Air conditioning indoor unit |
| 1 | Housing |
| 11 | Frame |
| 111 | Second ventilation opening |

-continued

| Reference Numeral | Name |
| --- | --- |
| 112 | Limiting protrusion |
| 12 | Panel |
| 121 | First ventilation opening |
| 122 | Second groove |
| 123 | Panel body |
| 124 | Air ventilation plate |
| 2 | Ventilator |
| 21 | First groove |
| 22 | Ventilation cover |
| 221 | Inner wall surface |
| 3 | Sealer |
| 31 | The first sealing ring |
| 311 | The first installing protrusion |
| 312 | Guiding portion |
| 32 | Second sealing ring |
| 321 | Second installing protrusion |
| 322 | Limiting groove |
| 33 | Third sealing ring |
| 331 | Side |
| 34 | Opening slot |

The implementation, functional characteristics and advantages of the present disclosure will be further described with reference to the attached drawings in combination with embodiments.

DETAILED DESCRIPTION OF EMBODIMENTS

It should be noted that if directional indications (such as up, down, left, right, front, back, etc.) are involved in the embodiments of the present disclosure, the directional indications are only used to explain the relative positional relationship and movement between the components in a certain posture (as shown in the drawings), and if the specific posture changes, the directional indications will change accordingly.

In addition, if there are descriptions of "first" and "second" in the embodiments of this disclosure, the descriptions of "first" and "second" are used for descriptive purposes only and cannot be understood as indicating or implying their relative importance or implicitly indicating the number of indicated technical features. Thus, features defining "first" and "second" may explicitly or implicitly include at least one such feature. In addition, the meaning of "and/or" appearing in the full text is to include three parallel schemes, taking "a and/or b" as an example, including solution of a or b, or solution that both a and b satisfy at the same time. In addition, the technical solutions between the various embodiments may be combined with each other, but must be based on what one of ordinary skill in the art can achieve. When the combination of technical solutions is contradictory or impossible to achieve, it should be considered that the combination of such technical solutions does not exist and is not within the protection scope required by the present disclosure.

The present disclosure provides an air conditioner indoor unit.

In at least one embodiment of the present disclosure, as shown in FIGS. 1 to 4, the air conditioning indoor unit 100 includes:

a housing 1 which includes a frame 11 and a panel 12, where the panel 12 is provided with a first ventilation opening 121, and the frame 11 is provided with a second ventilation opening 111 corresponding to the first ventilation opening 121;

a ventilator 2 installed in the housing 1, where an air passage of the ventilator 2 is communicated with the second ventilation opening 111; and a sealer 3 arranged at the second ventilation opening 111, and configured to seal a gap between the frame 11 and the ventilator 2 and/or a gap between the frame 11 and the panel 12.

In the present embodiment, the air conditioning indoor unit 100 may be a stand unit, a ceiling unit, a wall-mounted indoor unit, or the like. The housing 1 can provide a basic space for installation and a supporting structure for the air conditioning indoor unit 100. The housing 1 may also include an air guiding plate, a chassis, etc. The frame 11 can provide basic installation and support for the components installed therein, and is typically a frame structure. The specific structure can refer to the design in the market. The panel 12 is usually installed on the front side of the frame 11 to maintain the overall consistency of the air conditioning indoor unit 100. The panel 12 can be detachably installed on the frame 11 or movably connected to the frame 11. The specific structure is not limited herein, and an appropriate design can be selected according to practical requirements. The first ventilation opening 121 provided on the panel 12 may be an opening or may be of a plurality of small holes.

Figure 6:
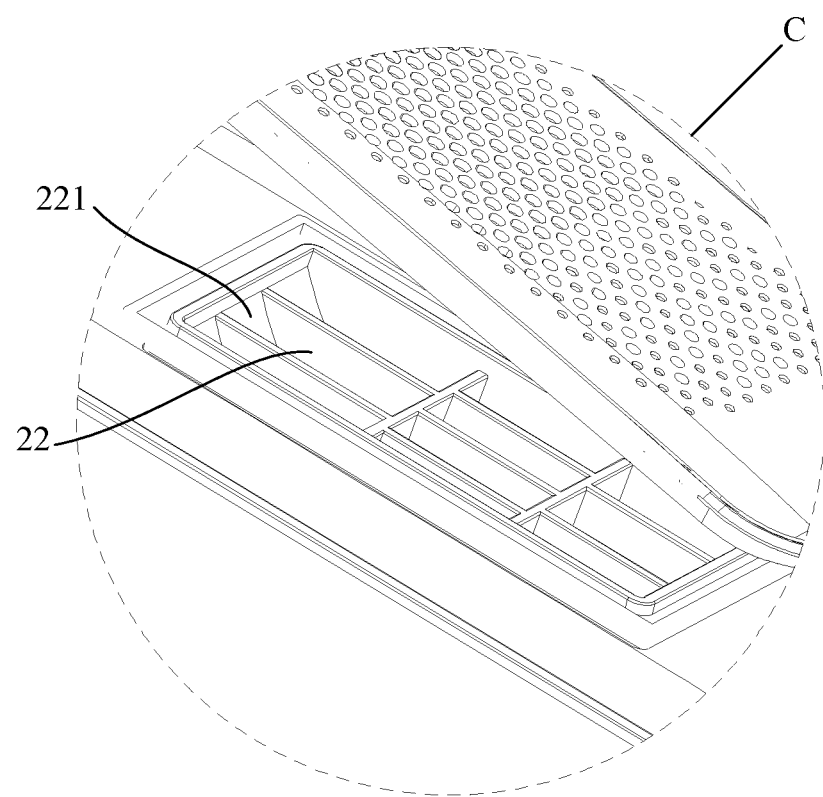
FIG. 6 is a partial enlarged view at portion C in FIG. 5.

The ventilator 2 is typically installed in the housing 1, and can introduce outdoor air into the room through the air passage, and air enters the room after passing through the second ventilation opening 111 and the first ventilation opening 121 in sequence to provide continuous and fresh air for the closed indoor space, thereby increasing the oxygen content of the indoor air and eliminating air conditioner sickness. Referring to FIG. 6, the ventilator 2 is generally provided with a ventilation cover 22 to form an air passage inside. The sealer 3 can seal the gap between the ventilation cover 22 and the frame 11. The sealer 3 may be consist of one or more of sealants, rubber sealers, silica-gel sealers, etc. The sealer 3 can be a structure independent of the ventilator 2, the frame 11, and the panel 12.

The arrangement of the sealer 3 at the second ventilation opening 111 is not limited herein to be mounted on the frame 11, but is only emphasized of the relative position between the sealer 3 and the second ventilation opening 111. That is, the sealer 3 may be mounted on the frame 11 or other structures which is mounted at the second ventilation opening 111. When the sealer 3 is only used to seal the gap between the frame 11 and the ventilator 2, the gap between the frame 11 and the panel 12 can be sealed by glue, or by nature of the structure regarding the panel 12 and the frame 11 themselves, etc. Similarly, when the sealer 3 is only used to seal the gap between the frame 11 and the panel 12, the gap between the ventilator 2 and the frame 11 can be sealed by glue, or by the nature of the structure of the ventilator 2 and the frame 11 themselves, etc.

According to the air conditioning indoor unit 100 proposed by the present disclosure, the sealer 3 is disposed at the second ventilation opening 111 of the frame 11, and the sealer 3 can seal the gap between the frame 11 and the ventilator 2 and/or the gap between the frame 11 and the panel 12, so that the air outlet of the ventilator 2 does not leak into the housing 1, thereby reducing the loss of the air output of the ventilator 2, improving the air exchange capacity of the ventilator 2, and simultaneously preventing the air from entering the interior of the air conditioning indoor unit to bring about noise and condensation.

Figure 4:
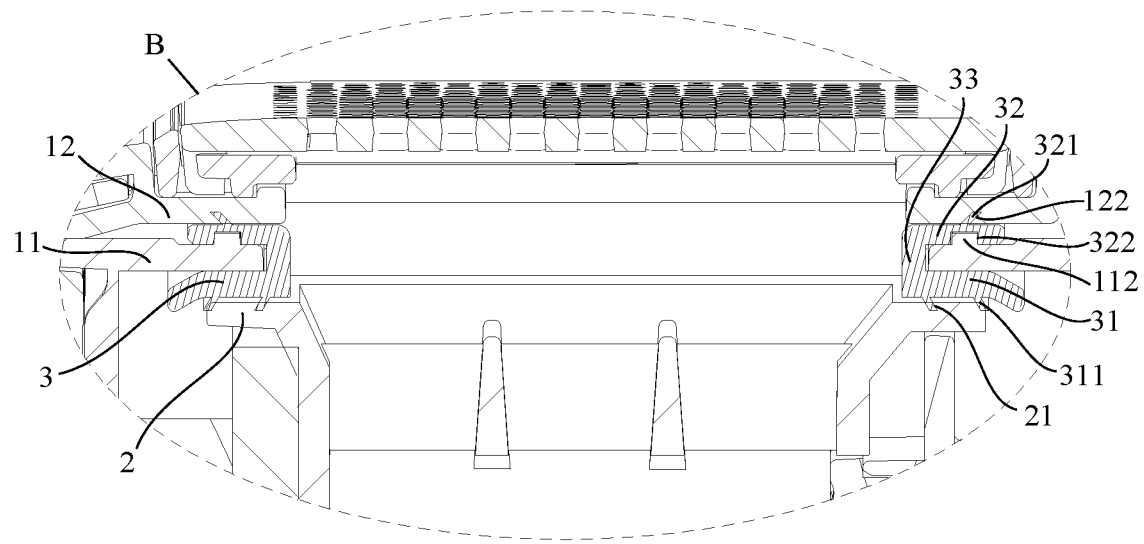
FIG. 4 is a partial enlarged view at portion B in FIG. 3.
Figure 5:
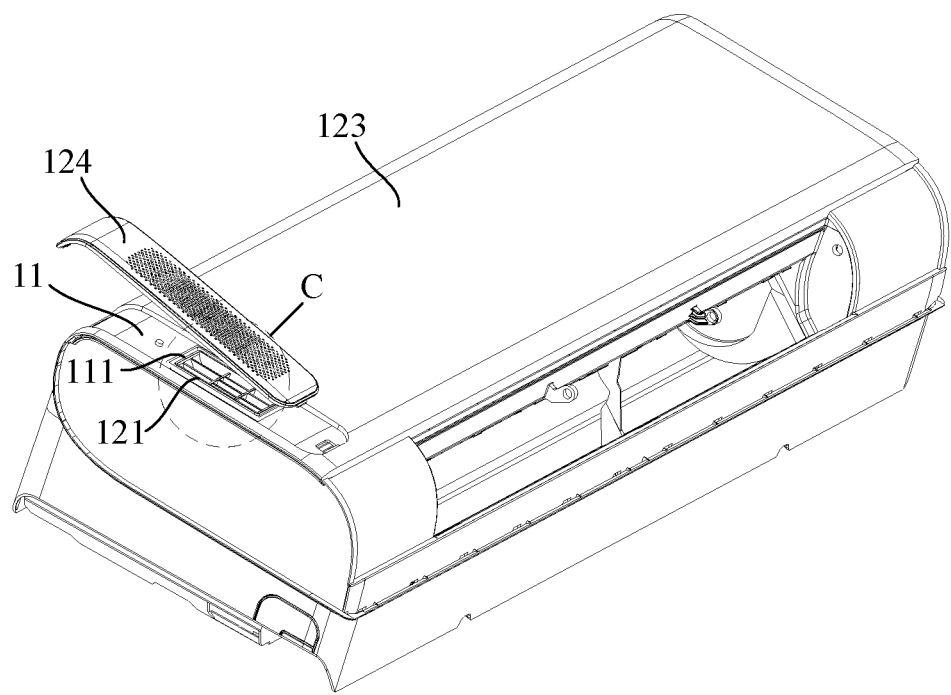
FIG. 5 is a schematic structural view of the air conditioning indoor unit according to another embodiment of the present disclosure.
Figure 7:
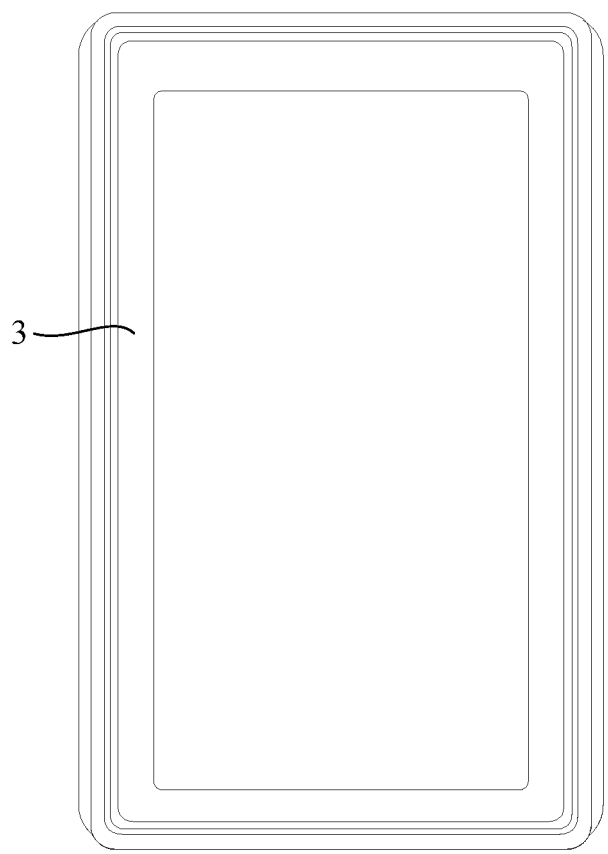
FIG. 7 is a schematic structural view of a sealer of the air conditioning indoor unit according to an embodiment of the present disclosure.
Figure 8:
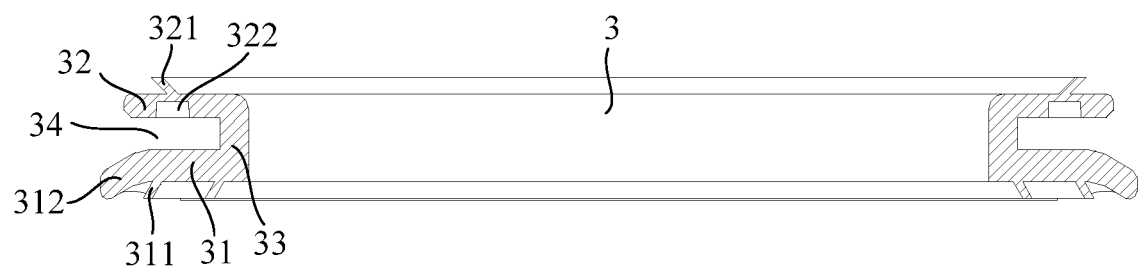
FIG. 8 is a schematic cross sectional structural view of the sealer in FIG. 7.
Figure 9:
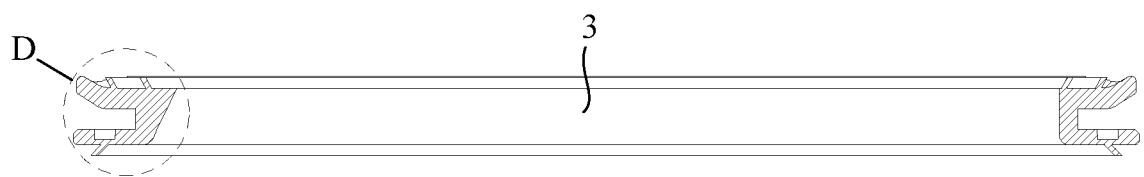
FIG. 9 is another schematic cross sectional structural view of the sealer in FIG. 7.

Further, referring to FIGS. 4, 7 and 8, the sealer 3 includes a first sealing ring 31 sandwiched between the frame 11 and the ventilator 2.

In the present embodiment, in order to improve the sealing effect, the shape of the first sealing ring 31 can be similar to that of the second ventilation opening 111. For example, when the second ventilation opening 111 is arranged rectangular, the first sealing ring 31 can be also arranged rectangular, and the hollow part of the first sealing ring 31 is also rectangular, which is disposed correspondingly to the second ventilation opening 111 to minimize shielding and facilitate a better outflow of fresh air. It can be understood that the first sealing ring 31 is sandwiched between the frame 11 and the ventilator 2, which means that the first sealing ring 31 is sandwiched between an edge of the frame 11 near the second ventilation opening 111 and an outer wall surface of the ventilator 2 near the second ventilation opening 111. The first sealing ring 31 can seal the gap between the frame 11 and the ventilator 2, so that when outdoor air enters the room through the ventilator 2, the air can be prevented from flowing into the housing 1 from the gap between the frame 11 and the ventilator 2, thereby reducing the air output loss from the ventilator 2, improving the air exchange capacity of the ventilator 2, and simultaneously preventing the air from entering the interior of the air conditioning indoor unit to bring about noise and condensation.

Further, the sealer 3 includes a second sealing ring 32 sandwiched between the frame 11 and the panel 12.

In the present embodiment, in order to further improve the sealing effect, the shape of the second sealing ring 32 can be similar to the shape of the second ventilation opening 111. For example, when the second ventilation opening 111 is arranged rectangular, the second sealing ring 32 can be also arranged rectangular, and the hollow part of the second sealing ring 32 is also rectangular, which is disposed correspondingly to the second ventilation opening 111 to minimize shielding and facilitate a better outflow of fresh air. It can be understood that the second sealing ring 32 is sandwiched between the frame 11 and the panel 12, which means that the second sealing ring 32 is sandwiched between an edge of the frame 11 close to the second ventilation opening 111, and an edge of the panel 12 close to the first ventilation opening 121. The first sealing ring 32 can seal the gap between the frame 11 and the panel 12, so that when outdoor air enters the room through the ventilator 2, the air can be prevented from flowing into the housing 1 from the gap between the frame 11 and the panel 12, thereby reducing the air output loss from the ventilator 2, improving the air exchange capacity of the ventilator 2, and simultaneously preventing the air from entering the interior of the air conditioning indoor unit to bring about noise and condensation.

The first sealing ring 31 and the second sealing ring 32 aforementioned may be two separate parts or two sealing rings formed by one sealing member. The first sealing ring 31 and the second sealing ring 32 may be integrally formed sealing rings or may be formed by splicing several sealing strips.

Further, the sealer 3 includes the first sealing ring 31, the second sealing ring 32, and a third sealing ring 33 connecting one end of the first sealing ring 31 and one end of the second sealing ring 32.

The first sealing ring 31, the second sealing ring 32 and the third sealing ring 33 are enclosed to form an opening groove 34, and the frame 11 is embedded in the opening groove 34 corresponding to the edge of the second ventilation opening 111.

The first sealing ring 31 is tightly attached to the ventilator 2, and the second sealing ring 32 is tightly attached to the panel 12.

In the present embodiment, it can be understood that the shape of the opening groove 34 formed by enclosing the first sealing ring 31, the second sealing ring 32 and the third sealing ring 33 is mated with the shape of the edge of the frame 11 corresponding to the second ventilation opening 111. The groove height of the opening groove 34 may be equal to or slightly smaller than edge thickness of the frame 11 corresponding to the second ventilation opening 111. By embedding the edge of the frame 11 corresponding to the second ventilation opening 111 into the opening groove 34, the gap between the frame 11 and the panel 12 and the gap between the ventilator 2 and the frame 11 can be sealed further, and the third sealing ring 33 enables the overall sealing effect better. The first sealing ring 31, the second sealing ring 32 and the third sealing ring 33 can be integrally formed, so that the installation of the sealer 3 can be facilitated. During installation, only the edge of the frame 11 corresponding to the second ventilation opening 111 needs to be embedded into the opening groove 34, and the gap between the frame 11 and the panel 12 and the gap between the frame 11 and the ventilator 2 can be sealed at the same time.

Further, one side of the first sealing ring 31 close to the ventilator 2 is provided with a first installing protrusion 311. The ventilator 2 is provided with a first groove 21 corresponding to the first installing protrusion 311, and the first installing protrusion 311 is embedded in the first groove 21.

In the present embodiment, the first installing protrusion 311 may be only one projection, a plurality of projections spaced circumferentially along the first sealing ring 31, or a protruding rib circumferentially around the first sealing ring 31. The number of the first installing protrusions 311 or the first grooves 21 may be more than one, and an appropriate number of the first installing protrusions 311 and the first grooves 21 may be designed according to the width of the first sealing ring 31 as well as the practical requirements. Correspondingly, the first groove 21 may be a plurality of spaced grooves or an annular groove. By arranging the first installing protrusion 311 on the first sealing ring 31, when the first sealing ring 31 is installed between the ventilator 2 and the frame 11, the first installing protrusion 311 is firstly fit in the first groove 21, and then the first sealing ring 31 and the ventilator 2 are abutted against each other through forces. As such, the installation of the first sealing ring 31 and the ventilator 2 can be facilitated, the attachment is tighter, and the dislocation and displacement can be prevented between the first sealing ring 31 and the ventilator 2 in the meantime.

Further, the first installing protrusion 311 can be disposed obliquely. The inclination of the first installing protrusion 311 may be in any direction. When the first installing protrusion 311 is an installing protruding rib disposed around the first sealing ring 31, the inclined position of the first installing protrusion 311 may be towards to or away from the third sealing ring 33. Therefore, the first installing protrusion 311 is obliquely arranged, which is not only convenient for molding and manufacturing, but also convenient for installing the first sealing ring 31 and provides a certain tolerance in installing deformation.

Further, one side of the second sealing ring 32 close to the panel 12 is provided with a second installing protrusion 321, the panel 12 is provided with a second groove 122 corresponding to the second installing protrusion 321, and the second installing protrusion 321 is embedded in the second groove 122.

In the present embodiment, the second installing protrusion 321 may be only one projection, a plurality of projections spaced circumferentially along the second sealing ring 32, or a protruding rib circumferentially around the second sealing ring 32. The number of the second installing protrusions 321 or the second grooves 122 may be more than one, and an appropriate number of the second installing protrusions 321 and the second grooves 122 may be designed according to the width of the second sealing ring 32 as well as the practical requirements. Correspondingly, the second groove 122 may be a plurality of spaced grooves or an annular groove. By arranging the second installing protrusion 321 on the second sealing ring 32, when the second sealing ring 32 is installed between the frame 11 and the panel 12, the second installing protrusion 321 can be firstly installed in the second groove 122, and then the second sealing ring 32 is abutted against the panel 12 by pressure. Thus, the installation of the second sealing ring 32 and the panel 12 can be facilitated, and the attachment is tighter, and the dislocation and displacement can also be prevented between the second sealing ring 32 and the panel 12.

Further, the second installing protrusion 321 is disposed obliquely. The inclination of the second installing protrusion 321 may be in any direction. When the second installing protrusion 321 is an installing protruding rib disposed around the second sealing ring 32, the inclined position of the second installing protrusion 321 may be towards to or away from the third sealing ring 33. Therefore, the second installing protrusion 321 is obliquely arranged (which is not only convenient for molding and manufacturing, but also convenient for installing the second sealing ring 32) and provides a certain tolerance for installing deformation.

Further, one side of the second sealing ring 32 close to the frame 11 is provided with a limiting groove 322, and the frame 11 corresponding to the limiting groove 322 is provided with a limiting protrusion 112 coupled with the limiting groove 322.

In the present embodiment, by providing the limiting groove 322 on the second sealing ring 32 and providing the limiting protrusion 112 in a limit fit with the limiting groove 322 on the frame 11, the installation can be more stable and the second sealing ring 32 can be prevented from falling from the frame 11, when the second sealing ring 32 is installed on the frame 11. The cross-sectional shapes of the limiting protrusion 112 and the limiting groove 322 can be rectangular, dovetail-shaped, V-shaped, etc. They can be designed according to practical requirements, which are not specifically limited herein. In some other embodiments, one side of the second sealing ring 32 close to the frame 11 is provided with the limiting protrusion 112, and at the frame 11 corresponding to the limiting groove 322 is provided with the limiting groove 322 which is in a limit fit with the limiting protrusion 112. This achieves a similar effect that prevents the second sealing ring 32 from falling from the frame 11.

Figure 10:
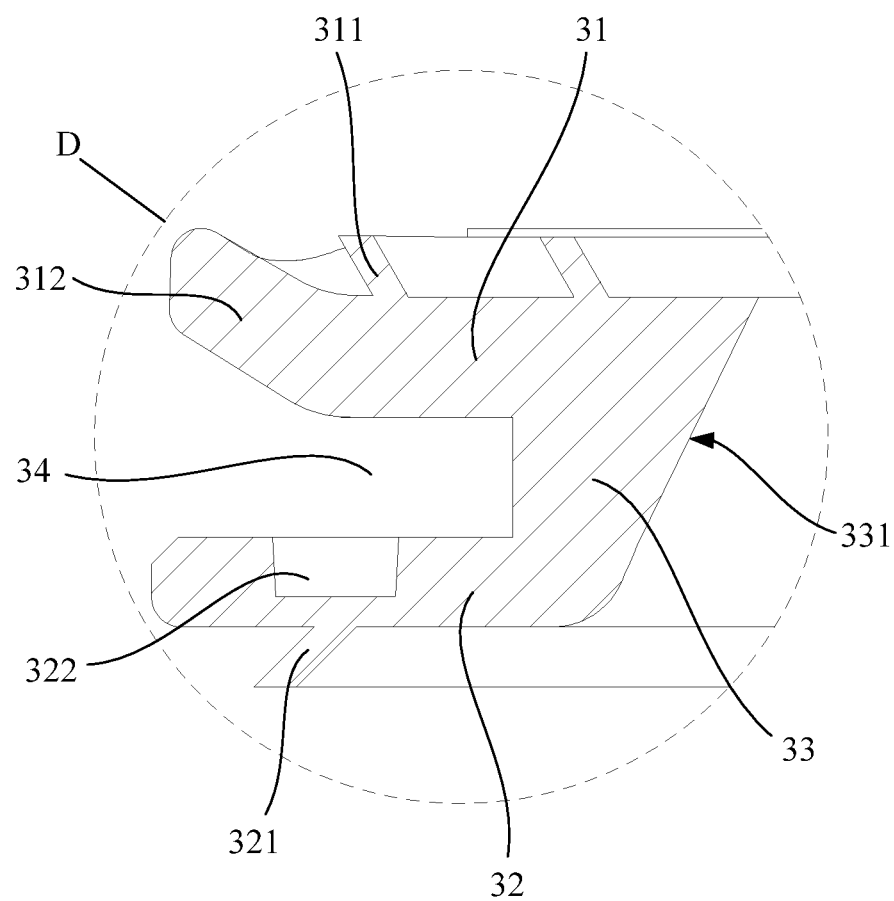
FIG. 10 is a partial enlarged view at portion D in FIG. 9.

Further, referring to FIGS. 8 and 10, one end of the first sealing ring 31 away from the third sealing ring 33 is provided with a guiding portion 312, and the guiding portion 312 is inclined towards the ventilator 2 from the direction away from the third sealing ring 33.

In the present embodiment, the guiding portion 312 provided by the first sealing ring 31 can guide for the installation of the first sealing ring 31, and the inclined arrangement of the guiding portion 312 can facilitate the installation of the first sealing ring 31 into the gap between the ventilator 2 and the frame 11.

FIGS. 5, 6, 9 and 10 illustrate collectively another exemplary embodiment. In this embodiment, the ventilator 2 includes a ventilation cover 22, at least one inner wall surface 221 of the ventilation cover 22 is disposed obliquely from the frame 11 to the panel 12, and the distance between the inner wall surface 221 and its opposite wall surface increases in a direction from the frame 11 towards the panel 12.

The side surface 331 of the third sealing ring 33 is disposed obliquely corresponding to the inner wall surface 221, and the inclined direction is consistent with that of the inner wall surface 221.

In the present embodiment, the ventilation cover 22 may include a ventilation screen, which plays a role in dust prevention and dust filtration. The ventilation screen is typically installed at the air outlet of the air passage, then the inclined inner wall surface 221 may also be the inner wall surface 221 of the ventilation screen. If the distance between the inclined inner wall surface 221 and its opposite wall surface is gradually increased in a direction from the frame 11 towards the panel 12, the inner wall surface 221 can play a role in guiding the air after flowing out of the air outlet, thereby enabling the flowing of the fresh air more smoothly. The inner wall surface 221 may be more than one and may be designed according to practical requirements. As long as the side surface 331 of the third sealing ring 33 corresponding to the inner wall surface 221 is disposed obliquely, and inclined direction of the side surface is consistent with that of the inner wall surface 221, the side surface 331 of the third sealing ring 33 may not hinder but guide the outflow of fresh air. In order to achieve a better air guiding effect and make the overall structure more uniform and aesthetic, the inclination angles of the side surface 331 and the inner wall surface 221 can be the same.

Figure 3:
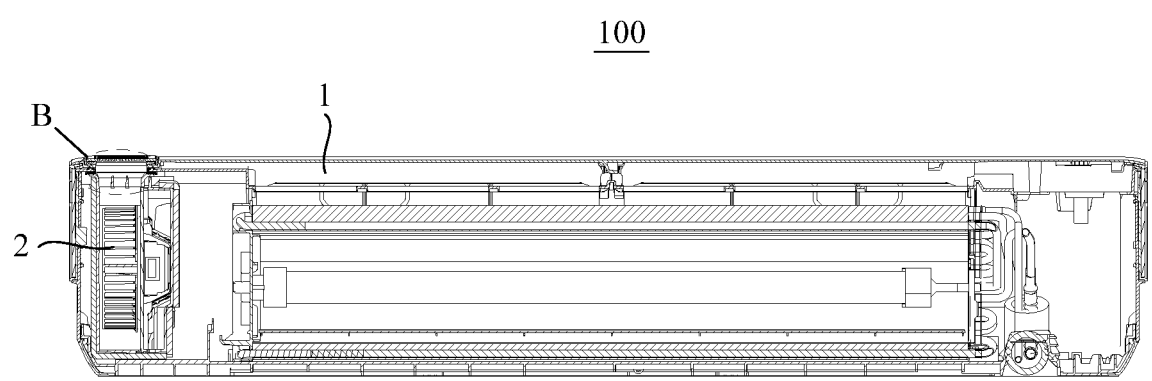
FIG. 3 is a schematic structural view of the air conditioning indoor unit according to another embodiment of the present disclosure.

Further, as shown in FIG. 3, the ventilator 2 includes a ventilation cover 22, a ventilation passage (not shown) and a fan (not shown) provided in the ventilation cover 22. The ventilation passage (not shown) and the air passage of the air conditioning indoor unit 100 are arranged independently of each other. The ventilation passage (not shown) includes an air inlet (not shown) and an air outlet (not shown), the air inlet (not shown) is communicated with the outside, and the air outlet (not shown) is communicated with the second ventilation opening 111.

In the present embodiment, the ventilation cover 22 provides a fundamental room for installing a fan (not shown) placed therein, and in the meanwhile a ventilation passage (not shown) forms inside, which is usually includes a scroll tongue and a scroll housing. The ventilation passage (not shown) and the air passage of the air conditioning indoor unit 100 are arranged independently of each other, so the fresh air introduced by the ventilation passage (not shown) will not affect the air with heat-exchanged in the air conditioning indoor unit 100 of the air conditioner. The air inlet of the ventilation passage (not shown) can be communicated with the outdoor through the air passage to introduce outdoor fresh air into the ventilation passage (not shown). Outdoor fresh air is introduced into the air passage through the action of the fan (not shown), and then flows into the room through the air outlet, the second ventilation opening 111 and the first ventilation opening 121 in sequence to complete the fresh air introduction. The fan (not shown) may be a centrifugal fan (not shown), a cross-flow fan (not shown), an axial flow fan (not shown), or the like, and is not specifically limited herein.

Further, as shown in FIGS. 1 to 5, the panel 12 includes a panel body 123 and an air ventilation plate 124 connected with the panel body 123, the air ventilation plate 124 is disposed correspondingly to the ventilator 2, and defines the first ventilation opening 121.

In the present embodiment, the panel 12 is composed of a panel body 123 and an air ventilation plate 124, and the panel body 123 may be connected or spliced with the air ventilation plate 124 to form the panel 12. The air ventilation plate 124 may be rotatably mounted on the panel body 123, may be detachably connected to the panel body 123, or may be provided with an adjustable structure to realize the joint with the panel body 123, and the connection is not specifically limited herein. The air ventilation plate 124 is independent disposed and can facilitate disassembly and cleaning of the ventilator 2. The first ventilation opening 121 provided on the air ventilation plate 124 may be an opening or a plurality of small holes.

The present disclosure further proposes an air conditioner, which includes an air conditioning outdoor unit and an air conditioning indoor unit 100. The specific structure of the air conditioning indoor unit 100 refers to the above-mentioned embodiments. Since the air conditioner adopts all the technical solutions of the above-mentioned embodiments, it has at least all the beneficial effects brought by the technical solutions of the above-mentioned embodiments, and will not be repeated herein.

The description aforementioned is only the exemplary embodiment of the present disclosure and is not intended to limit the scope of the present disclosure. Any equivalent structural modification made by using the description and drawings of the present disclosure or direct/indirect application in other related technical fields under the concept of the present disclosure shall be included in the protection scope of the present disclosure.

What is claimed is:

1. An air conditioning indoor unit comprising:
    a housing comprising a frame and a panel, wherein the panel defines a first ventilation opening, and the frame defines a second ventilation opening corresponding to the first ventilation opening;
    a ventilator in the housing, communicated with the second ventilation opening; and
    a sealer disposed at the second ventilation opening, wherein the sealer is configured to seal a gap between the frame and the ventilator and/or a gap between the frame and the panel.

2. The air conditioning indoor unit of claim 1, wherein the first ventilation opening comprises one opening or a plurality of small holes.

3. The air conditioning indoor unit of claim 1, wherein the sealer comprises a first sealing ring sandwiched between the frame and the ventilator.

4. The air conditioning indoor unit of claim 1, wherein the sealer comprises a second sealing ring sandwiched between the frame and the panel.

5. The air conditioning indoor unit of claim 1, wherein:
    the sealer comprises a first sealing ring, a second sealing ring and a third sealing ring connecting one end of the first sealing ring to one end of the second sealing ring, the first sealing ring, the second sealing ring and the third sealing ring are enclosed to form an opening groove, and a part of the frame corresponding to an edge of the second ventilation opening is embedded in the opening groove; and the first sealing ring is abutted against the ventilator, and the second sealing ring is abutted against the panel.

6. The air conditioning indoor unit of claim 5, wherein the first sealing ring, the second sealing ring and the third sealing ring are integrally formed.

7. The air conditioning indoor unit of claim 5, wherein:
the first sealing ring comprises a first installing protrusion at a side of the first sealing ring close to the ventilator, and
the ventilator defines a first groove corresponding to the first installing protrusion, for accommodating the first installing protrusion.

8. The air conditioning indoor unit of claim 7, wherein the first mounting protrusion is arranged obliquely.

9. The air conditioning indoor unit of claim 7, wherein:
the second sealing ring comprises a second installing protrusion at a side of the second sealing ring close to the panel, and
the panel defines a second groove corresponding to the second installing protrusion, for accommodating the second installing protrusion.

10. The air conditioning indoor unit of claim 9, wherein the second installing protrusion is obliquely disposed.

11. The air conditioning indoor unit of claim 9, wherein:
the second sealing ring defines a limiting groove at a side of the second sealing ring close to the frame, and
the frame comprises a limiting protrusion correspondingly mated with the limiting groove.

12. The air conditioning indoor unit of claim 11, wherein a cross section of the limiting protrusion and the limiting groove has a rectangular, dovetail or "V" shape.

13. The air conditioning indoor unit of claim 5, wherein:
the first sealing ring comprises a guiding portion at an end away from the third sealing ring, and
the guiding portion is obliquely disposed towards the ventilator in a direction away from the third sealing ring.

14. The air conditioning indoor unit of claim 5, wherein:
the ventilator comprises a ventilation cover, at least one inner wall surface of the ventilation cover is inclined in a direction from the frame to the panel, and a distance between the inner wall surface and a wall surface opposite to the inner wall surface is increased in a direction from the frame to the panel; and the third sealing ring is inclined and provided correspondingly to a side surface of the inner wall surface, and the side surface is inclined in a direction consistent to an inclination direction of the inner wall surface.

15. The air conditioning indoor unit of claim 14, wherein the ventilation cover comprises a ventilation screen.

16. The air conditioning indoor unit of claim 1, wherein:
the ventilator comprises a ventilation cover, a ventilation passage and a fan in the ventilation cover,
wherein the ventilation passage is independent from an air passage of the air conditioning indoor unit, and comprises an air inlet and an air outlet, and
the air inlet is communicated with an outer environment and the air outlet is communicated with the second ventilation opening.

17. The air conditioning indoor unit of claim 1, wherein:
the panel comprises a panel body and an air ventilation plate connected with the panel body,
the air ventilation plate is disposed correspondingly to the ventilator, and
the first ventilation opening is defined on the air ventilation plate.

18. The air conditioning indoor unit of claim 17, wherein:
the air ventilation plate is detachably connected with the panel body; or
the air ventilation plate is rotatably mounted on the panel body.

19. The air conditioning indoor unit of claim 1, wherein the air conditioning indoor unit is a stand unit, a ceiling unit or a wall-mounted indoor unit.

20. An air conditioner, comprising an outdoor unit and an air conditioner indoor unit connected to the outdoor unit, wherein the air conditioning indoor unit comprises:
a housing comprising a frame and a panel, wherein the panel defines a first ventilation opening, and the frame defines a second ventilation opening corresponding to the first ventilation opening;
a ventilator in the housing, communicated with the second ventilation opening; and
a sealer disposed at the second ventilation opening, configured to seal a gap between the frame and the ventilator and/or seal a gap between the frame and the panel.

* * * * *